Feb. 8, 1955
H. E. MALONE
2,701,830
THERMAL CUTOUT FOR WATER HEATERS
Filed Aug. 24, 1953
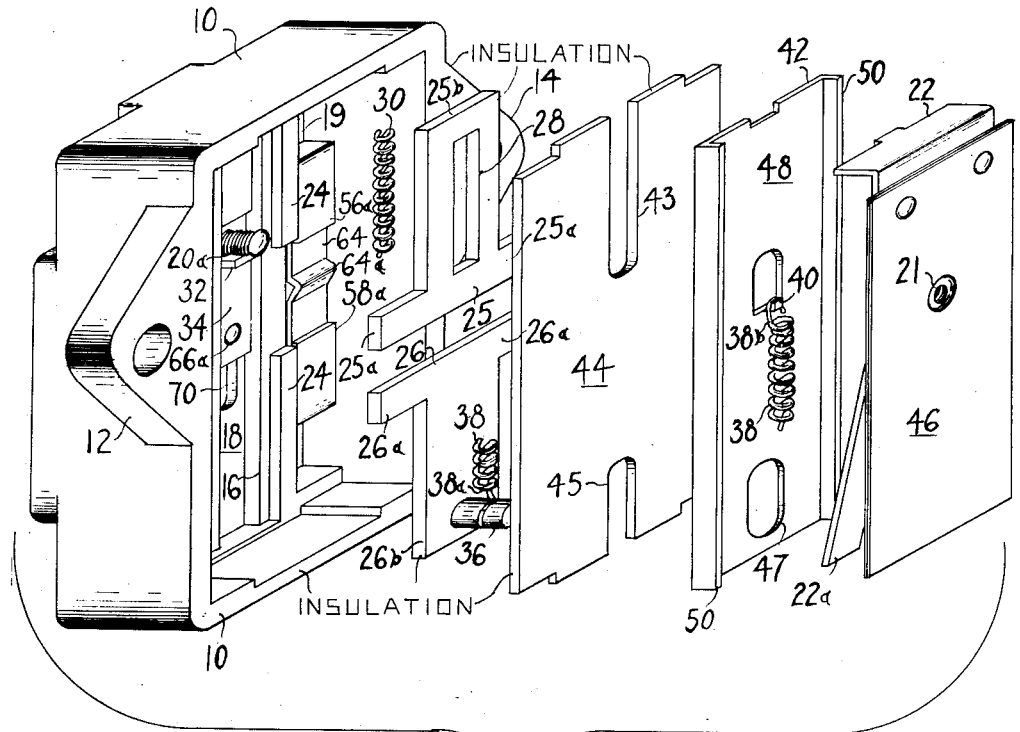
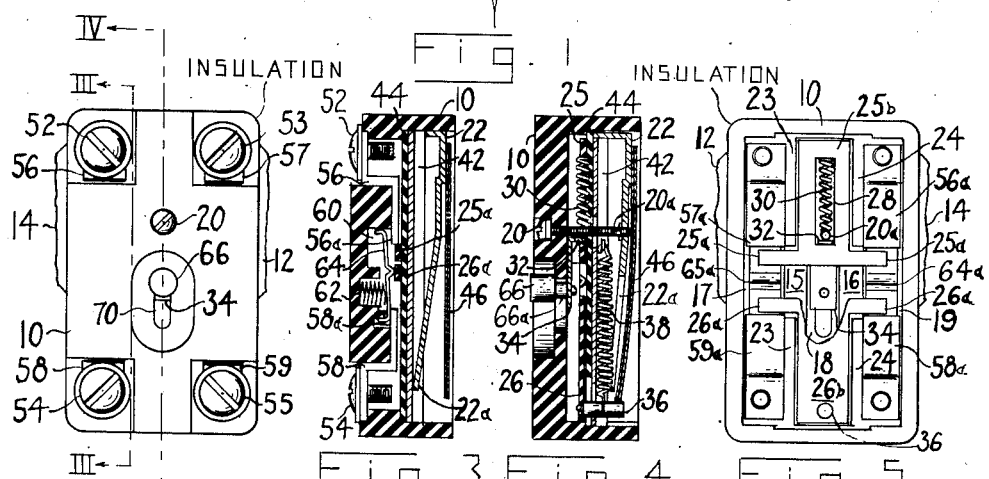
INVENTOR.
HOMER E. MALONE
BY
Tate, Weikart & Barr
ATTORNEYS : 2,701,830
Patented Feb. 8, 1955

2,701,830
THERMAL CUTOUT FOR WATER HEATERS

Homer E. Malone, Milwaukee, Wis., assignor to Perfex Corporation, Milwaukee, Wis., a corporation of Wisconsin Application August 24, 1953, Serial No. 375,873

6 Claims. (Cl. 200—138)

This invention concerns a novel type of safety device for use in conjunction with a domestic water heater or similar heat demand system. Specifically, it concerns a thermal limit or cut-out switch which may be thermostatically operated to open a control circuit in response to a high temperature.

In conventional water heater systems a thermostat is utilized as a heat demand controller to effect operation of the system in response to a low water temperature and to discontinue operation after the attainment of a higher water temperature sufficient to satisfy the hot water requirements. Generally, one or more safety devices are incorporated with the thermostat to safeguard the system in the event of abnormal operation. These safety devices provide a safety function for pressure, temperature and current overloads and may be utilized singly or in concert within the system. It has been found that a pressure relief valve is insufficient under certain conditions to provide the full protection needed in a domestic water heating system. Thus, a high temperature safety control is added to provide complete shut down in the event of dangerously high water temperature. In this connection various types of high temperature controls or cut-outs have been devised with varying degrees of success.

This invention concerns a type of high temperature cut-out that is characterized by the following salient features small overall size, relatively flat to reduce projection, ease of adjustment and reset, proximity of thermal element to heater tank and consequent rapidity of response, and adaptability to various installations. These factors are important because of the space limitations and tank locations which necessitate small inconspicuous controls that are easy to adjust, observe, reset and maintain.

In the present invention the high temperature, or thermal, cut-out is placed in position on the tank surface in proximity to the control thermostat to facilitate wiring, etc. Its function is to respond to a high temperature, usually at least 20 degrees above the highest temperature setting on the control thermostat; by interrupting the electrical circuit for the water heater preventing continued heating beyond a safe temperature value. As with most safety controls, the thermal cut-out is designed to protect the installation in the event of failure of the operating controls (such as the control thermostat) or other safety controls (such as the pressure relief valve) when their defective operation would result in a dangerous condition. The invention primarily protects the heater system from all defects that would result in the continued heating of the water beyond a safe temperature value.

One of the objects of the invention is to provide a thermal cut-out with means for manually resetting after the safety function has been performed and the unsafe condition eliminated. In this latter connection, the invention provides a means for effectively preventing the continued operation of the system without correcting the unsafe condition. On some safety controls, one means of retaining the heater in operation after a dangerous temperature has been reached has been to jam or secure the reset button in its reset position to maintain the cut-out in closed-contact position. This, of course, eliminates the cut-out as a safety control. To prevent this expedient but unsafe arrangement, the invention provides a "trip-free" accessory which cooperates with the action of the reset button to open the circuit when the reset button is restrained in reset position, allowing the circuit to close only when the reset button is released. These and further objects of the invention will be more particularly pointed out in the following specification and in the appended claims.

Reference is now made to the accompanying drawing in which:

Figure 1 represents an enlarged exploded perspective view of the invention;
Figure 2 represents a front plan view;
Figure 3 represents a side plan view in section taken along the lines III—III of Figure 2 with the invention shown in its switch open or cut-out position;
Figure 4 represents a side plan view in section taken along the lines IV—IV of Figure 2; and
Figure 5 represents a rear plan view with some of the parts removed to show inner details of the invention.

Referring now to Figure 1, there is shown an insulation casing or receptacle 10 having projections 12 and 14 for mounting the cut-out on the side of a water heater tank or similar appliance. The receptacle 10 has two molded shoulders 15 and 16 (Figures 1 and 5) defining three channels 17, 18 and 19 within the receptacle base. The center channel 18 serves as a runway or guide for the reset mechanism. The outer channels 17 and 19 provide containers for the electrical and switch components to be subsequently described.

As shown in Figures 1, 2, 4, and 5, an adjusting and retaining screw 20 having a threaded shank 20a is removably inserted in the receptacle base and ultimately engages a threaded portion 21 of retaining fork 22. Note in Figure 1 that each of the components located between the receptacle 10 and fork 22 have apertures to allow the shank 20a to pass therethrough to engage threaded portion 21. The screw 20 has a dual function, first it serves as a retaining screw to hold the assembled components (Figure 4), and secondly it permits a temperature or calibrating adjustment as will be subsequently described.

Two pair of raised extensions of the shoulders 15 and 16 serve as guide rails 23 and 24 for the switch actuating slides 25 and 26. The slides 25 and 26 have foot portions 25b and 26b which ride between the guide rails 23 and 24 upon the surface of shoulders 15 and 16. The upper or trip slide 25 has a slotted opening 28 which provides a receptacle for a trip slide spring 30, screw shank 20a and an upturned ear 32 of the reset arm 34 (Figures 1, 4 and 5). The lower or reset slide 26 has a latch pin 36 secured thereto which supports one end 38a of a reset slide spring 38. The other end 38b of spring 38 is secured to a struck-out portion 40 of a channel member 42. In its assembled form as shown in Figure 4 in contra-distinction to its exploded appearance in Figure 1, an insulator 44 is inserted between the slides 25 and 26 and the channel member 42, with spring 38 lying along the surface 48 of member 42 and spring 30 resting in the groove made by slot 28 and slot 43. The latch pin 36 in the assembled position will project through a slot 45 in the insulator 44 and a hole 47 in the member 42.

The channel member 42 serves as a container for the retaining fork 22 and its legs 22a (one of which is shown). A bimetallic blade 46 is riveted to the fork 22 on a flat portion thereof. The lower extremities of fork legs 22a press against the surface 48 of member 42 within the confines of channel sides 50. Thus, adjustment of screw 20 will serve to position the bimetallic blade 46 in relation to the surface 48 of member 42 and the rest of the assembly. The fork legs 22a are somewhat resilient and return to their initial shape and position upon the release of screw 20.

The bimetallic blade 46 responds to temperature changes affecting its outer surface, i. e., the surface exposed to the water heater tank and flexes its free end in a counterclockwise direction (to the right in Figures 1, 3 and 4) upon an increase in temperature, and conversely flexes clockwise or to the left upon a decrease in temperature. Ordinarily, the cut-out is set to open the switch contacts at a temperature of about 200° F. which represents a temperature slightly in excess of the highest temperature setting on a conventional water heater thermostat. The cut-out temperature setting (200° F.) is obtained by the adjustment of screw 20 to position the bimetallic blade 46 so that its flexure will be sufficient to disengage the free end of blade 46 from the latch pin 36 (Figure 4) when the 200° temperature is reached.

The switch elements, generally located in channels 17 and 19 will now be described. As shown in Figures 2 and 3, terminal screws 52, 53, 54 and 55 are threaded into terminal brackets 56, 57, 58 and 59, respectively. The terminal brackets 56, 57, 58 and 59 have leg portions 56a, 57a, 58a and 59a, respectively, which lie along the inside of the receptacle 10 (Figure 3). In the middle of channels 17 and 19 there are identical compartments 60 which contain springs 62 (one of which is shown in Figure 3) and contacts 64 and 65 (only one of which, 64, is shown in Figures 1 and 3). The springs 62 bias the contacts 64 and 65 away from the receptacle base and against the terminal bracket legs 56a, 57a, 58a and 59a, respectively (Figure 5). The contact surfaces of legs 56a through 59a inclusive may be covered with silver alloy inserts to ensure good electrical contact with the contacts 64 and 65.

The switch components described above complete parallel electric circuits as follows: from terminal screw 52, terminal bracket 56, leg 56a, contact 64, leg 58a, terminal bracket 58, to terminal screw 54; and from terminal screw 53, terminal bracket 57, leg 57a, contact 65, leg 59a, terminal bracket 59 to terminal screw 55. Therefore, a two wire circuit may be connected across terminal screws 52 through 55 so that the circuit may be controlled by the switch components in both branches of the parallel circuit, i. e. both wires may be broken or completed, similar to a double pole-single throw switch. Because of the safety function of the cut-out, it is desirable that the cut-out be wired in the electrical supply circuit ahead of the control devices, so that it may de-energize the entire system for complete shut down.

The manual reset mechanism will now be described. As shown in Figures 2 and 4, a reset button 66 having a reduced portion or shank 66a is slidably mounted in a slotted groove 70. The reset arm 34 is secured to the reset shank 66a by means of a peened end of shank 66a (Figures 1 and 5). The upturned ear 32 of reset arm 34, heretofore described, engages in the slot 28 of trip slide 25. Thus, manual operation of the reset button 66 in a downward direction will carry the ear 32 and trip slide 25 downwardly against the bias of spring 30. Note that spring 30 is compressed because the trip slide foot 25b and the upper end of slot 28 are moving downwardly while the lower end of spring 30 remains stationary due to the fixed position of screw shank 20a (Figure 5). Upon manual release of the reset button 66 the above described mechanism will return to its normal or standby position by action of spring 30.

*Operation*

In the operation assume that the cut-out is in the position shown in Figures 1, 2, 4 and 5 which is its position before the cut-out temperature has been reached. This is the normal position of the cut-out when operating conditions are satisfactory. The reset slide 26 and its latch pin 36 are held in their lowermost position by the free end of bimetallic blade 46 (Figure 4). The reset slide spring 38 will be under tension as shown in Figure 4. The contacts 64 and 65 under the bias of their springs 62 will be bearing against the surfaces of terminal bracket legs 56a, 58a, and 57a, 59a, respectively (Figure 5). Thus, the controlled circuit is maintained in its closed position for normal operation. With a temperature rise in the water heater tank above the normal operating temperature of the control thermostat, i. e., abnormal operation, the bimetallic blade 46 will flex to the right until the latch pin 36 is disengaged. The reset slide spring 38 will then exert a force to move the reset slide 26 upwardly with the wings 26a bearing down on the contact elevations 64a and 65a to move the contacts 64 and 65 away from the terminal bracket legs 56a and 57a, respectively. This opens the parallel circuit and the cut-out components assume the positions shown in Figure 3. After the unsafe condition or its cause has been removed, the cut-out will be in position for manual reset. If the high temperature remains, the reset action will fail in as much as the bimetallic blade 46 will remain in its flexed position and no latching with pin 36 will be possible. However, if the tank has cooled, due to the removal of the unsafe condition occasioning the high temperatures, the bimetallic blade will cool and flex to the left. Under this latter condition, reset action may be obtained because the bimetal blade 46 will be in position (Figure 4) to restrain the latch pin 36.

The "trip-free" accessory and its function will now be described. When reset action is required, the operator grasps the reset button 66 and moves it downwardly. Thus, the reset arm 34 and its ear 32 are moved downwardly against the restraining force of spring 30. This movement carries the trip slide 25 and its wings 25a downwardly with the lower edge of slide 25 engaging the upper edge of reset slide 26 at a point near the contact elevations 64a and 65a. Note, that the reset slide 26 will be in its uppermost position with the wings 26a bearing down on the contact elevations 64a and 65a to maintain the circuit open position. The further downward movement of slides 25 and 26 will ordinarily result in the latch pin 36 engaging the bimetal 46 and the release of button 66 will return the trip slide 25 to its normal inactive position (Figures 3, 4, and 5). However, if the bimetal 46 has not flexed sufficiently far to the left, reset action is impossible, and in the event that the operator secures the reset button 66 in its lowermost position by wedging a match stick or tying with a string, etc., in order to continue operation of the system, a closed circuit will not be maintained because in moving the button 66 downwardly the trip slide 25 and its wings 25a will bear down on the contact elevations 64a and 65a, in a similar manner to the cut-out position of wings 26a, to open the contacts 64 and 56a and this position will be maintained as long as the button 66 is restrained in any way, in its approximate lowermost or reset position. Thus, it is only upon completion of the reset operation, i. e. moving button 66 downwardly and releasing it, that the circuit can be reclosed. Obviously, this leaves the operator with a single alternative, the correction of the trouble causing the high temperature in the system in order to maintain continuous and satisfactory operation of the hot water or similar heating system. In the event this latter feature, trip free reset, is to be eliminated the cut-out is readily adaptable by the removal of trip slide 25 and spring 30 with the substitution of a projection (not shown) on the reset slide 26 which abuts the ear 32. Then the reset action may be obtained by movement of button 66, arm 34 and ear 32 downwardly, pushing the projection of slide 26 and slide 26 with its latch pin 36 into latching engagement with the bimetal 46 as heretofore described. In this adaptation the operator would be able to secure the reset button 66 in its lowermost position to maintain continued operation. Spring 38, held at one end 38b by a fixed point 40, biases the trip slide 26 in an upward direction, and moves the slide 26 upwardly whenever the latch pin 36 is out of engagement with bimetal 46.

With a slight wiring modification the thermal cut-out may be converted to a current overload cut-out for use in an electrical network where excess currents are to be avoided. For example, the bimetal blade 46 may be connected in series with a circuit to be controlled and the resultant high currents utilized to heat the bimetal, or a resistance in the circuit may be used to transmit heat to the bimetal 46. The reset action of the cut-out would be similarly utilized to effect completion of the circuit after the current overload has been corrected or decreased.

Further modifications of the invention are possible and the invention is contemplated to be limited only by the scope of the appended claims.

What is claimed is:

1. A thermal cut-out comprising a casing, switch contacts within said casing, a reset slide moveable within said casing for engagement with said contacts, a trip slide moveable within said casing for engagement with said contacts, a bimetallic blade engageable with said reset slide at a first temperature to maintain said reset slide out of engagement with said contacts, said blade releasing said reset slide at a second temperature to effect opening of said contacts, and a reset button engageable with said trip slide to move said trip slide to a position in engagement with said contacts retaining said contacts in their open position while moving said reset slide back into engagement with said bimetallic blade.

2. A thermal cut-out comprising a casing, switch contacts within said casing biased to a closed contact position, a pair of slides moveable within said casing and each having portions engageable with said contacts at one position of travel to open said contacts, one of said pair of slides having a latch means engageable with a bimetallic blade to restrain said one slide in another position out of engagement with said contacts, spring means biasing said slides in one direction, and a reset means engageable with the other of said slides to move said other slide to said one position to open said contacts and to move said one slide into latching engagement with said bimetallic blade against the bias of said spring means.

3. A thermal cut-out comprising a casing, switch contacts within said casing biased to a closed contact position, a pair of slides moveable within said casing and each having portions engageable with said contacts to effect switch opening, one of said pair of slides having a latch means engageable with a temperature responsive element to restrain said one slide in a position out of engagement with said contacts until said temperature responsive element attains a predetermined temperature whereby said one slide is released to move into contact opening position, and a reset means engageable with the other of said slides to move said other slide into contact opening position while moving said one slide into latching engagement with said temperature responsive element.

4. In a device of the character described, a switch housing having a base and an open end opposite thereto, a fixed contact mounted on the inner face of said base, a moveable contact mounted adjacent said fixed contact for cooperation therewith, a contact operating member moveable in a plane parallel to said base, engaging means on said member engageable with the moveable contact to separate said fixed and moveable contacts, resilient means urging said member to a position in which said means is in engagement with said moveable contact, an element overlying said member moveable normal to the plane of movement of said member in response to temperature change and having a latching engagement with said member to retain it out of said position against the force exerted by said resilient means and upon a predetermined temperature change moving out of latching engagement with said member to permit said member to move to said position.

5. In a device of the character described, a switch housing having a base and an open end opposite thereto, a fixed contact mounted on the inner face of said base, a moveable contact mounted adjacent said fixed contact for cooperation therewith, a contact operating member moveable in a plane parallel to said base, engaging means on said member engageable with the moveable contact to separate said fixed and moveable contacts, resilient means urging said member to a position in which said means is in engagement with said moveable contact, an element overlying said member moveable normal to the plane of movement of said member in response to temperature change and having a latching engagement with said member to retain it out of said position against the force exerted by said resilient means and upon a predetermined temperature change moving out of latching engagement with said member to permit said member to move to said position, and manually operable means accessible from the outer face of said base for manually returning said member to latching engagement with said element.

6. In a device of the character described, a switch housing having a base and an open end opposite thereto, a fixed contact mounted on the inner face of said base, a moveable contact mounted adjacent said fixed contact for cooperation therewith, a contact operating member moveable in a plane parallel to said base, engaging means on said member engageable with the moveable contact to separate said fixed and moveable contacts, resilient means urging said member to a position in which said means is in engagement with said moveable contact, an element overlying said member moveable normal to the plane of movement of said member in response to temperature change and having a latching engagement with said member to retain it out of said position against the force exerted by said resilient means and upon a predetermined temperature change moving out of latching engagement with said member to permit said member to move to said position, and manually operable means accessible from the outer face of said base for manually returning said member to latching engagement with said element, and a second contact operating member moveable into engagement with said moveable contact only while said manually operable means is returning said first mentioned contact operating member to latching engagement with said element.

References Cited in the file of this patent

UNITED STATES PATENTS

| | | |
|---|---|---|
| 2,593,301 | Havasi | Apr. 15, 1952 |
| 2,627,002 | Alvarez | Jan. 27, 1953 |